(12) United States Patent
McCowin et al.

(10) Patent No.: US 8,986,482 B2
(45) Date of Patent: Mar. 24, 2015

(54) METHOD AND APPARATUS FOR PRODUCING COMPOSITE STRUCTURES

(75) Inventors: Peter D. McCowin, Enumclaw, WA (US); Mark C. Boberg, Bellevue, WA (US); Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 12/498,307

(22) Filed: Jul. 6, 2009

(65) Prior Publication Data

US 2010/0006205 A1    Jan. 14, 2010

Related U.S. Application Data

(60) Provisional application No. 61/134,308, filed on Jul. 8, 2008.

(51) Int. Cl.
*B29C 70/38* (2006.01)

(52) U.S. Cl.
CPC .................................. *B29C 70/388* (2013.01)
USPC ............................ 156/184; 156/425; 156/573

(58) Field of Classification Search
CPC ............................ B29C 70/388; B29C 70/386
USPC ......... 156/166, 173, 175, 425, 573, 523, 441, 156/433
See application file for complete search history.

(56) References Cited

U.S. PATENT DOCUMENTS

| | | |
|---|---|---|
| 799,374 A | 9/1905 | Gray et al. |
| 920,776 A | 5/1909 | Pohl |
| 1,132,837 A | 3/1915 | Eggleston |
| 1,195,554 A | 8/1916 | Bourdin |
| 1,370,339 A | 3/1921 | Midgley |
| 1,420,271 A | 6/1922 | McLane |
| 1,464,632 A | 8/1923 | Wayne |
| 1,512,096 A | 10/1924 | Hopkinson |
| 1,930,733 A | 10/1933 | Tomlin |
| 2,182,358 A | 12/1939 | Sherts et al. |
| 2,220,760 A | 11/1940 | Gates et al. |
| 2,345,541 A | 3/1944 | Scholze, Jr. |
| 2,722,590 A | 11/1955 | Engler |
| 2,871,716 A | 2/1959 | Stade |
| 3,037,898 A | 6/1962 | Zumofen |
| 3,137,452 A | 6/1964 | Winders |
| 3,329,181 A | 7/1967 | Buss et al. |
| 3,574,040 A | 4/1971 | Chitwood et al. |
| 3,602,416 A | 8/1971 | Basche et al. |

(Continued)

FOREIGN PATENT DOCUMENTS

| | | |
|---|---|---|
| DE | 2505223 | 8/1976 |
| DE | 20120792 | 5/2003 |

(Continued)

OTHER PUBLICATIONS

Machine translation of PCT WO 03/035380, date unknown.*

(Continued)

*Primary Examiner* — Jeff Aftergut
(74) *Attorney, Agent, or Firm* — Yee & Associates, P.C.

(57) ABSTRACT

A composite part is formed by a composite tape application machine that lays up a plurality of tapes on a substrate. The lateral position of the tapes may be adjusted as the tapes are being laid up.

22 Claims, 6 Drawing Sheets

(56) References Cited

U.S. PATENT DOCUMENTS

| | | |
|---|---|---|
| 3,684,278 A | 8/1972 | Takahaski |
| 3,695,977 A | 10/1972 | Kandelaki et al. |
| 3,775,219 A | 11/1973 | Karlson et al. |
| 3,810,805 A * | 5/1974 | Goldsworthy ............... 156/361 |
| 3,844,822 A | 10/1974 | Boss et al. |
| 3,910,522 A | 10/1975 | Lee et al. |
| 3,970,831 A | 7/1976 | Hegyi |
| 3,992,240 A | 11/1976 | Kuehn, Jr. |
| 4,091,979 A | 5/1978 | Browder |
| 4,100,004 A | 7/1978 | Moss et al. |
| 4,133,711 A | 1/1979 | August et al. |
| 4,135,447 A | 1/1979 | Barnes et al. |
| 4,186,861 A | 2/1980 | Steinhilber |
| 4,208,238 A | 6/1980 | August et al. |
| 4,234,374 A | 11/1980 | Frank |
| 4,241,884 A | 12/1980 | Lynch |
| 4,259,144 A | 3/1981 | Ballentine |
| 4,267,951 A | 5/1981 | Grant et al. |
| 4,285,752 A | 8/1981 | Higgins |
| 4,292,108 A | 9/1981 | Weiss et al. |
| 4,328,061 A | 5/1982 | Off et al. |
| 4,351,688 A | 9/1982 | Weiss et al. |
| 4,351,992 A | 9/1982 | Crouch |
| 4,382,836 A | 5/1983 | Frank |
| 4,419,170 A | 12/1983 | Blad |
| 4,432,828 A | 2/1984 | Siempelkamp et al. |
| 4,461,669 A | 7/1984 | Dontscheff |
| 4,462,551 A | 7/1984 | Bloch |
| 4,491,493 A | 1/1985 | Eaton |
| 4,506,969 A | 3/1985 | Baker |
| 4,508,584 A | 4/1985 | Charles |
| 4,531,992 A | 7/1985 | Eaton |
| 4,541,886 A | 9/1985 | Marlow et al. |
| 4,557,783 A | 12/1985 | Grone et al. |
| 4,557,790 A | 12/1985 | Wisbey |
| 4,560,433 A | 12/1985 | Frank |
| 4,569,716 A | 2/1986 | Pugh |
| 4,574,029 A | 3/1986 | Murray |
| 4,588,466 A | 5/1986 | Eaton |
| 4,591,402 A | 5/1986 | Evans et al. |
| 4,627,886 A | 12/1986 | Grone et al. |
| 4,636,276 A | 1/1987 | Nozaka |
| 4,680,806 A | 7/1987 | Bolza-Schunemann |
| 4,696,707 A | 9/1987 | Lewis et al. |
| 4,699,683 A | 10/1987 | McCowin |
| 4,706,442 A | 11/1987 | Riemenschneider |
| 4,707,212 A | 11/1987 | Hailey et al. |
| 4,750,965 A | 6/1988 | Pippel et al. |
| 4,781,782 A | 11/1988 | Luhman et al. |
| 4,799,981 A | 1/1989 | Stone et al. |
| 4,842,215 A | 6/1989 | Takami |
| 4,867,834 A | 9/1989 | Alenskis et al. |
| 4,877,471 A | 10/1989 | McCowin et al. |
| 4,878,984 A * | 11/1989 | Bourrieres .................. 156/431 |
| 4,880,488 A | 11/1989 | Matsuo et al. |
| 4,909,880 A | 3/1990 | Kittelson et al. |
| 4,938,824 A | 7/1990 | Youngkeit |
| 4,943,338 A | 7/1990 | Wisbey |
| 4,978,417 A | 12/1990 | Grimshaw et al. |
| 4,990,213 A | 2/1991 | Brown et al. |
| 5,000,397 A | 3/1991 | Darrieux |
| 5,041,179 A | 8/1991 | Shinno et al. |
| 5,045,147 A | 9/1991 | Benson et al. |
| 5,100,493 A | 3/1992 | Leclere et al. |
| 5,110,395 A | 5/1992 | Vaniglia |
| 5,114,519 A | 5/1992 | Grimshaw et al. |
| 5,120,976 A | 6/1992 | Clayton et al. |
| 5,148,572 A | 9/1992 | Wells et al. |
| 5,197,198 A | 3/1993 | Onozato |
| 5,200,018 A | 4/1993 | Gill et al. |
| 5,213,646 A | 5/1993 | Zsolnay et al. |
| 5,249,120 A | 9/1993 | Foley |
| 5,290,386 A | 3/1994 | Trudeau |
| 5,290,389 A | 3/1994 | Shupe et al. |
| 5,294,803 A | 3/1994 | Pahr |
| 5,345,399 A | 9/1994 | Collins |
| 5,397,415 A | 3/1995 | Manabe et al. |
| 5,431,749 A | 7/1995 | Messner |
| 5,448,505 A | 9/1995 | Novak |
| 5,480,508 A | 1/1996 | Manabe et al. |
| 5,482,589 A | 1/1996 | Shin et al. |
| 5,560,942 A | 10/1996 | Curry |
| 5,562,788 A | 10/1996 | Kitson et al. |
| 5,627,647 A | 5/1997 | Baan et al. |
| 5,645,677 A | 7/1997 | Cahuzac et al. |
| 5,659,229 A | 8/1997 | Rajala |
| 5,698,066 A | 12/1997 | Johnson et al. |
| 5,700,347 A | 12/1997 | McCowin |
| 5,725,175 A | 3/1998 | Thundathil |
| 5,879,505 A | 3/1999 | Fujisawa et al. |
| 5,954,917 A | 9/1999 | Jackson et al. |
| 6,041,840 A | 3/2000 | Ogawa |
| 6,073,670 A | 6/2000 | Koury |
| 6,096,164 A | 8/2000 | Benson et al. |
| 6,100,986 A | 8/2000 | Rydningen |
| 6,112,792 A | 9/2000 | Barr et al. |
| 6,164,477 A | 12/2000 | Druckman et al. |
| 6,215,553 B1 | 4/2001 | Rider et al. |
| 6,240,333 B1 | 5/2001 | McGee |
| 6,262,814 B1 | 7/2001 | Furukawa |
| 6,312,247 B1 | 11/2001 | Kassuelke et al. |
| 6,315,235 B1 | 11/2001 | Breyer et al. |
| 6,325,568 B1 | 12/2001 | Druckman et al. |
| 6,391,436 B1 | 5/2002 | Xu et al. |
| 6,436,528 B1 | 8/2002 | Kulper et al. |
| 6,441,905 B1 | 8/2002 | Tojyo et al. |
| 6,451,152 B1 | 9/2002 | Holmes et al. |
| 6,459,494 B1 | 10/2002 | Kurokawa et al. |
| 6,474,389 B1 | 11/2002 | Steelman et al. |
| 6,520,234 B1 | 2/2003 | Anderson et al. |
| 6,544,367 B1 | 4/2003 | Fujimoto et al. |
| 6,638,388 B2 | 10/2003 | Nagata et al. |
| 6,675,688 B2 | 1/2004 | Ostini |
| 6,706,131 B2 | 3/2004 | Steelman et al. |
| 6,748,836 B2 | 6/2004 | Vivirito et al. |
| 6,752,190 B1 | 6/2004 | Boll et al. |
| 6,764,754 B1 | 7/2004 | Hunter et al. |
| 6,767,426 B1 | 7/2004 | Yamamoto |
| 6,773,537 B2 | 8/2004 | Erickson et al. |
| 6,799,081 B1 | 9/2004 | Hale et al. |
| 6,799,619 B2 | 10/2004 | Holmes et al. |
| 6,823,342 B2 | 11/2004 | Wallen et al. |
| 6,860,957 B2 | 3/2005 | Sana et al. |
| 6,900,547 B2 | 5/2005 | Polk, Jr. et al. |
| 6,966,966 B2 | 11/2005 | Koizumi et al. |
| 6,968,971 B2 | 11/2005 | Ely |
| 6,979,501 B2 | 12/2005 | Merton |
| 6,984,429 B2 | 1/2006 | Thunhorst et al. |
| 7,010,544 B2 | 3/2006 | Wallen et al. |
| 7,048,024 B2 | 5/2006 | Clark et al. |
| 7,063,118 B2 | 6/2006 | Hauber et al. |
| 7,137,182 B2 * | 11/2006 | Nelson ........................ 29/428 |
| 7,206,665 B2 | 4/2007 | Groppe |
| 7,213,629 B2 | 5/2007 | Ledet et al. |
| 7,282,107 B2 | 10/2007 | Johnson et al. |
| 7,293,590 B2 | 11/2007 | Martin |
| 7,326,312 B1 | 2/2008 | Rust et al. |
| 7,337,818 B2 | 3/2008 | Briese et al. |
| 7,341,086 B2 | 3/2008 | Nelson et al. |
| 7,376,480 B2 | 5/2008 | Hagen et al. |
| 7,407,556 B2 | 8/2008 | Oldani et al. |
| 7,419,031 B2 | 9/2008 | Liguore et al. |
| 7,455,740 B2 | 11/2008 | Bostanjoglo et al. |
| 7,455,742 B2 | 11/2008 | Ledet et al. |
| 7,472,736 B2 | 1/2009 | Kisch et al. |
| 7,478,780 B2 | 1/2009 | Wilding et al. |
| 7,517,426 B2 | 4/2009 | Mano et al. |
| 7,527,084 B2 | 5/2009 | Kaczkowski |
| 7,536,242 B2 | 5/2009 | Ledet et al. |
| 7,591,294 B2 * | 9/2009 | Wampler et al. ............. 156/523 |
| 7,643,970 B2 | 1/2010 | Drumheller et al. |
| 7,681,615 B2 | 3/2010 | McCowin |
| 7,717,151 B2 | 5/2010 | Wampler et al. |
| 7,747,421 B2 | 6/2010 | Tang et al. |

(56) References Cited

U.S. PATENT DOCUMENTS

| | | | |
|---|---|---|---|
| 7,748,425 B2 | 7/2010 | Tingley | |
| 7,766,063 B2 | 8/2010 | Lauder et al. | |
| 7,769,481 B2 | 8/2010 | Tang et al. | |
| 7,809,454 B2 | 10/2010 | Hu et al. | |
| 7,824,512 B2 | 11/2010 | Lauder et al. | |
| 7,842,145 B2 | 11/2010 | Hogg | |
| 7,849,903 B2 | 12/2010 | Vaniglia | |
| 7,867,352 B2 * | 1/2011 | Johnson et al. | 156/250 |
| 7,922,856 B2 | 4/2011 | Hagman et al. | |
| 8,029,642 B2 | 10/2011 | Hagman | |
| 8,147,637 B2 | 4/2012 | Kisch et al. | |
| 8,156,988 B2 | 4/2012 | Martinez | |
| 8,205,532 B2 | 6/2012 | DeVlieg et al. | |
| 2003/0015298 A1 | 1/2003 | Steelman et al. | |
| 2003/0102070 A1 | 6/2003 | Black et al. | |
| 2003/0145932 A1 | 8/2003 | Holmes et al. | |
| 2004/0026025 A1 | 2/2004 | Sana et al. | |
| 2004/0112534 A1 | 6/2004 | Koizumi et al. | |
| 2004/0226651 A1 | 11/2004 | Ledet et al. | |
| 2005/0016671 A1 | 1/2005 | Sharp et al. | |
| 2005/0039842 A1 | 2/2005 | Clark et al. | |
| 2005/0039843 A1 * | 2/2005 | Johnson et al. | 156/175 |
| 2005/0194210 A1 | 9/2005 | Panossian | |
| 2005/0227124 A1 | 10/2005 | Merton | |
| 2005/0247396 A1 | 11/2005 | Oldani et al. | |
| 2006/0073309 A1 | 4/2006 | Hogg | |
| 2006/0090856 A1 | 5/2006 | Nelson et al. | |
| 2006/0106507 A1 | 5/2006 | Ledet et al. | |
| 2006/0118244 A1 | 6/2006 | Zaballos et al. | |
| 2006/0147669 A1 | 7/2006 | Mano et al. | |
| 2006/0162143 A1 * | 7/2006 | Nelson et al. | 29/431 |
| 2006/0180270 A1 | 8/2006 | Ledet et al. | |
| 2006/0226651 A1 | 10/2006 | Griswold et al. | |
| 2006/0260751 A1 | 11/2006 | Lauder et al. | |
| 2007/0029030 A1 | 2/2007 | McCowin | |
| 2007/0034340 A1 | 2/2007 | Kaczkowski | |
| 2007/0039434 A1 | 2/2007 | DeVlieg et al. | |
| 2007/0044896 A1 | 3/2007 | Tingley | |
| 2007/0044900 A1 | 3/2007 | Tingley | |
| 2007/0069080 A1 | 3/2007 | Rassaian et al. | |
| 2007/0077896 A1 | 4/2007 | Ho et al. | |
| 2007/0102239 A1 | 5/2007 | Liguore et al. | |
| 2007/0106407 A1 | 5/2007 | Drumheller et al. | |
| 2007/0106418 A1 | 5/2007 | Hagen et al. | |
| 2007/0144676 A1 | 6/2007 | Tang et al. | |
| 2007/0150087 A1 * | 6/2007 | Tang et al. | 700/119 |
| 2007/0187024 A1 | 8/2007 | Johnson et al. | |
| 2007/0234907 A1 | 10/2007 | Torres Martinez | |
| 2008/0277057 A1 | 11/2008 | Montgomery et al. | |
| 2008/0282863 A1 | 11/2008 | McCowin | |
| 2008/0302483 A1 | 12/2008 | Vaniglia | |
| 2009/0025875 A1 | 1/2009 | Hagman | |
| 2009/0076638 A1 | 3/2009 | Hu et al. | |
| 2009/0078361 A1 | 3/2009 | Kisch et al. | |
| 2009/0079998 A1 | 3/2009 | Anderson et al. | |
| 2009/0082892 A1 | 3/2009 | Tang et al. | |
| 2009/0166467 A1 | 7/2009 | Hagman et al. | |
| 2009/0205767 A1 | 8/2009 | Lauder et al. | |
| 2009/0211698 A1 | 8/2009 | McCowin | |
| 2009/0301648 A1 * | 12/2009 | Hogg et al. | 156/230 |
| 2010/0193103 A1 | 8/2010 | McCowin | |
| 2010/0224716 A1 | 9/2010 | McCowin | |
| 2010/0230043 A1 | 9/2010 | Kisch | |
| 2011/0114265 A1 | 5/2011 | Hagman et al. | |
| 2011/0277941 A1 | 11/2011 | Hagman | |
| 2013/0037649 A1 | 2/2013 | McCowin | |

FOREIGN PATENT DOCUMENTS

| | | |
|---|---|---|
| DE | 10342658 | 4/2005 |
| EP | 1775108 | 4/2007 |
| EP | 1804146 | 7/2007 |
| EP | 1859917 | 11/2007 |
| EP | 1977882 A1 | 10/2008 |
| EP | 1992473 | 11/2008 |
| EP | 2077246 | 7/2009 |
| EP | 2228200 | 9/2010 |
| EP | 2228333 | 9/2010 |
| ES | 2253005 | 5/2006 |
| GB | 2065566 | 7/1981 |
| JP | 05126536 | 5/1993 |
| JP | 07182724 | 7/1995 |
| JP | 08327330 | 12/1996 |
| JP | 09210665 | 8/1997 |
| JP | 2006347121 | 12/2006 |
| SU | 1019227 | 5/1983 |
| WO | WO0196223 | 12/2001 |
| WO | WO-03/035380 A1 * | 5/2003 |
| WO | WO2005030458 | 4/2005 |
| WO | 2005105641 A2 | 11/2005 |
| WO | 2006021601 A1 | 3/2006 |
| WO | WO-2006/060270 A1 * | 6/2006 |
| WO | WO2006060270 | 6/2006 |
| WO | WO2006101379 | 9/2006 |
| WO | WO2006118692 | 11/2006 |
| WO | WO-2006/134422 A2 * | 12/2006 |
| WO | WO2009038895 | 3/2009 |
| WO | WO2009038943 | 3/2009 |
| WO | 2009/049850 | 7/2009 |
| WO | WO2009108517 | 9/2009 |
| WO | 2010005996 A2 | 1/2010 |

OTHER PUBLICATIONS

USPTO Notice of Allowance, dated Jul. 9, 2012, regarding U.S. Appl. No. 13/012,617, 36 pages.

USPTO Supplemental Notice of Allowance, dated Jul. 31, 2012, regarding U.S. Appl. No. 12/400,600, 4 pages.

International Search Report dated Feb. 5, 2010, regarding Application No. PCT/US2009/049850, 2 pages. (WO 2010/005996).

PCT Application No. PCT/ES2005/000408, filed Jul. 20, 2005, 32 pages.

PCT Application No. PCT/US2009/049850, filed Jul. 7, 2009, 17 pages.

Ashizawa et al., "Manufacturing Technology for Polymer Composite Structures," JTEC Panel Report on Advanced Manufacturing Technology for Polymer Composite Structures in Japan, Apr. 1994, 20 pages.

Cincinnati Milacron, "Into the Future With Better Ways to Automate the Manufacture of Composite Parts," Cincinnati Milacron Publication No. SP-152-3, 1998, 22 pages.

Collins, "Measuring Small," Computer Technology Review, vol. XXV No. 3, 2005, 5 pages.

European Search Report dated Sep. 15, 2008, regarding Application No. EP08008877 (EP1992473), 3 pages.

European Search Report dated Nov. 30, 2010, regarding Application No. EP08173139 (EP2077246), 2 pages.

European Search Report dated Jun. 7, 2010, regarding Application No. EP10250405 (EP2228333), 2 pages.

European Search Report dated Jun. 23, 2010, regarding Application No. EP10250484 (EP2228200), 3 pages.

Evans et al., "Fiber Placement Process Study," SAMPE 34th Symposium Book of Proceedings, Reno, NV, May 8-11, 1989, pp. 1822-1833.

Guillermin, "Advanced Composite Engineering using MSC.Pantran and FiberSIM." Composite Design Technologies, Jul. 20, 2004, 15 pages.

International Search Report dated Apr. 1, 2005, regarding Application No. PCT/US2004/015144 (WO2005030458), 2 pages.

International Search Report dated Aug. 30, 2006, regarding Application No. PCT/US2006/010704 (WO2006118692), 3 pages.

International Search Report dated Dec. 3, 2008, regarding Application No. PCT/US2008/072450 (WO2009038895), 3 pages.

International Search Report dated Mar. 2, 2009, regarding Application No. PCT/US2008/074612 (WO2009038943), 4 pages.

International Search Report dated May 28, 2009 regarding Application No. PCT/US2009/034048 (WO2009108517), 2 pages.

Koschmieder et al., "On-Line Tow Width Measurement in Filament Winding," Proceedings of the 45th International SAMPE Symposium and Exhibition, Long Beach, CA, May 21-25, 2000, pp. 1417-1426.

(56) References Cited

OTHER PUBLICATIONS

Morrison et al., "Automatic Controlled Apparatus for Producing Tobacco Smoke Filter Rods," USPTO Defensive Publication No. T941,011, Dec. 2, 1975, 3 pages.
Olsen et al., "Automated Composite Tape Lay-up Using Robotic Devices," Proceedings of the International Conference on Robotics and Automation, Atlanta, GA, May 1993, pp. 291-297.
USPTO Office Action dated Jan. 11, 2005 regarding U.S. Appl. No. 10/437,067, 10 pages.
USPTO Final Office Action dated Jul. 1, 2005 regarding U.S. Appl. No. 10/437,067, 9 pages.
USPTO Office Action dated Feb. 17, 2006 regarding U.S. Appl. No. 10/437,067, 10 pages.
USPTO Notice of Allowance dated Sep. 13, 2006 regarding U.S. Appl. No. 10/437,067, 7 pages.
USPTO Supplemental Notice of Allowance dated Dec. 27, 2006 regarding U.S. Appl. No. 10/437,067, 4 pages.
USPTO Office Action dated Feb. 6, 2008 regarding U.S. Appl. No. 11/116,222, 13 pages.
USPTO Final Office Action dated Sep. 5, 2008 regarding U.S. Appl. No. 11/116,222, 12 pages.
USPTO Notice of Allowance dated Mar. 27, 2009 regarding U.S. Appl. No. 11/116,222, 4 pages.
USPTO Office Action dated Jun. 6, 2009 regarding U.S. Appl. No. 11/116,222, 11 pages.
USPTO Office Action dated Nov. 24, 2009 regarding U.S. Appl. No. 11/116,222, 9 pages.
USPTO Notice of Allowance dated Mar. 25, 2010 regarding U.S. Appl. No. 11/116,222, 5 pages.
USPTO Office Action dated Feb. 1, 2010 regarding U.S. Appl. No. 12/423,472, 36 pages.
USPTO Office Action dated Jul. 8, 2010 regarding U.S. Appl. No. 12/423,472, 25 pages.
USPTO Notice of Allowance dated Sep. 17, 2010 regarding U.S. Appl. No. 12/423,472, 6 pages.
USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 11/196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
USPTO Final Office Action dated Feb. 2, 2011 regarding U.S. Appl. No. 11/829,525, 12 pages.
USPTO Notice of Allowance dated Jun. 21, 2011 regarding U.S. Appl. No. 11/29,525, 8 pages.
USPTO Office Action dated Mar. 31, 2010 regarding U.S. Appl. No. 11/859,745, 18 pages.
USPTO Final Office Action dated Oct. 14, 2010 regarding U.S. Appl. No. 11/859,745, 22 pages.
USPTO Office Action dated Mar. 28, 2011 regarding U.S. Appl. No. 11/859,745, 24 pages.
USPTO Ex Parte Quayle Action dated Jan. 4, 2012 regarding U.S. Appl. No. 11/859,745, 9 pages.
USPTO Notice of Allowance dated Feb. 13, 2012 regarding U.S. Appl. No. 11/859,745, 9 pages.
USPTO Office Action dated Aug. 19, 2010 regarding U.S. Appl. No. 11/968,542, 10 pages.
USPTO Notice of Allowance dated Dec. 17, 2010 regarding U.S. Appl. No. 11/968,542, 9 pages.
USPTO Notice of Allowance dated Apr. 25, 2012 regarding U.S. Appl. No. 13/012,617, 16 pages.
USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated May 10, 2011 regarding U.S. Appl. No. 12/363,749, 11 pages.
USPTO Final Office Action dated Feb. 21, 2012 regarding U.S. Appl. No. 12/363,749, 8 pages.
USPTO Office Action dated Jun. 22, 2011 regarding U.S. Appl. No. 12/404,265, 10 pages.
USPTO Notice of Allowance dated Nov. 10, 2011 regarding U.S. Appl. No. 12/404,265, 9 pages.
USPTO Notice of Allowance dated Feb. 17, 2012 regarding U.S. Appl. No. 12/404,265, 11 pages.
USPTO Office Action dated Apr. 12, 2010 regarding U.S. Appl. No. 12/400,600, 14 pages.
USPTO Final Office Action dated Sep. 17, 2010 regarding U.S. Appl. No. 12/400,600, 18 pages.
USPTO Notice of Allowance dated Mar. 28, 2012 regarding U.S. Appl. No. 12/400,600, 5 pages.
USPTO Notice of Allowance dated Jun. 8, 2012 regarding U.S. Appl. No. 11/859,745, 40 pages.
USPTO Supplemental Notice of Allowance dated Jun. 19, 2012 regarding U.S. Appl. No. 11/859,745, 38 pages.
USPTO Office Action dated Jun. 21, 2012 regarding U.S. Appl. No. 13/169,160, 45 pages.
USPTO Notice of Allowance, dated Jun. 28, 2012, regarding U.S. Appl. No. 12/400,600, 64 pages.
Office Action, dated Feb. 1, 2013, regarding U.S. Appl. No. 12/363,749, 45 pages.
Notice of Allowance, dated Feb. 19, 2013, regarding U.S. Appl. No. 13/189,160, 18 pages.

* cited by examiner

METHOD AND APPARATUS FOR PRODUCING COMPOSITE STRUCTURES

CROSS REFERENCE TO RELATED APPLICATIONS

This application claims the benefit of Provisional U.S. Patent Application No. 61/134,308 filed Jul. 8, 2008, which is incorporated by reference herein in its entirety.

TECHNICAL FIELD

This disclosure generally relates to automated machines and methods for laying up composite tape.

BACKGROUND

Composite structures such as those used in the automotive, marine, and aerospace industries may be fabricated using automated composite material application machines, commonly referred to as automated fiber placement (AFP) machines. AFP machines may be used in the aircraft industry, for example, to fabricate structural shapes and skin assemblies by laying up relatively narrow strips of composite tape or "tows," collimated into a wider band, on a manufacturing tool. The AFP machine aligns and places a plurality of tape strips, typically six or more, in continuous edge-to-edge contact forming a single conformal band which is placed on and compacted against the tool.

In order to fabricate large complex laminated assemblies, current AFP machines using fiber placement heads may have a relatively high degree of operational flexibility. For example, current placement heads may have the ability to add, drop-off, or cut any or all of the contiguous tape strips independently of all others by providing separate, independently controllable cutters for each tape strip.

While both highly flexible and efficient, current AFP machines may have limitations in terms of their productivity. For example, current AFP machines employ a single head having multiple tape supplies that lay down aligned tape courses edge-to-edge to form a single bandwidth. In those applications where head speed has been optimized, additional increases in productivity, i.e., the amount of tape laid down per unit time, may require the provision of additional tape supplies on the head in order to increase the bandwidth. Adding tape supplies not only result in a larger and more complicated head, but may limit flexibility in some applications due, for example, to difficulties in steering a larger head.

Accordingly, there is a continuing need for improved methods and apparatus that increase the laydown rate of composite tape.

SUMMARY

According to a number of disclosed embodiments, a method is provided of laying tape to form a composite part. The method comprises adjusting the lateral position of at least one tape control module in a plurality of the tape control modules as tape is being laid by the modules. Adjusting the lateral position of the tape control module is performed such that the distance between adjacent tapes is altered, the lateral position being substantially orthogonally oriented to a direction of travel of the plurality of tape control modules. Adjusting the lateral position of the tape control module may be performed automatically according to a preprogrammed set of instructions.

According a number of other embodiments, a method is provided of forming a composite part by laying up a plurality of composite tapes. The lateral position of at least one of the tapes is automatically adjusted and the tapes are aggregated into a bandwidth of tape during lay-up. Automatically adjustment of the lateral position is performed using a programmed control system. The adjusting step may comprise adjusting the lateral position of two adjacent tapes.

According to still other embodiments, a method is provided of applying bands of composite tape over a substrate. The method includes moving a tape application head over the substrate and laying down multiple courses of composite tape on the substrate from positions on the head that are staggered in the direction of travel of the head. The lateral positions of at least certain of the courses are adjusted as the head is moving over the substrate. Adjusting the lateral positions of the courses is performed automatically according to a set of pre-programmed instructions, and by adjusting the lateral positions of tape control modules on the tape application head.

According to other embodiments, a tape layup machine is provided for forming a composite part. The machine comprises a plurality of tape control modules for laying up tape, and means coupled with the modules for adjusting the lateral position of at least certain of the modules. The machine further comprises a control system and a program used by the control system to adjust the lateral position of the at least certain modules as tape is being laid up by the modules.

According to another embodiment, a tape application machine is provided for laying up composite tape on a substrate. The machine comprises a head movable over the substrate in a direction of travel, and a carrier mounted on the head. A plurality of tape control modules are mounted on the carrier for laying up courses of tape on the substrate. A motor is mounted on the head, and a drive coupled between the motor and the modules is operable for adjusting the lateral position of at least certain of the modules on the head.

Other features and advantages of the present invention will become apparent to those skilled in the art from a consideration of the following detailed description taken in conjunction with the accompanying drawings.

DESCRIPTION OF THE ILLUSTRATIONS

DETAILED DESCRIPTION

Figure 1:
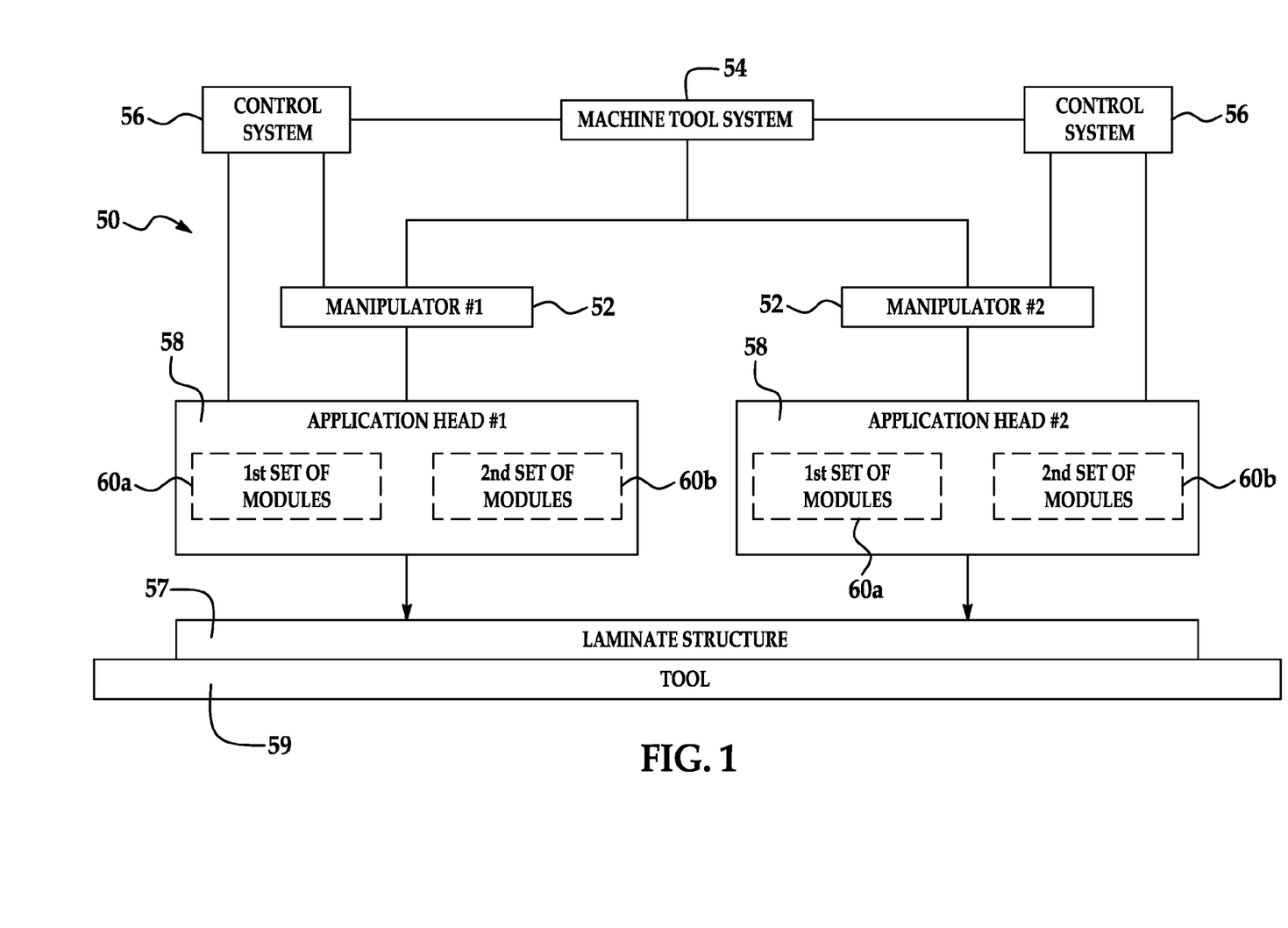
FIG. 1 is an illustration of an overall block diagram of a system for producing composite laminates.
Figure 2:
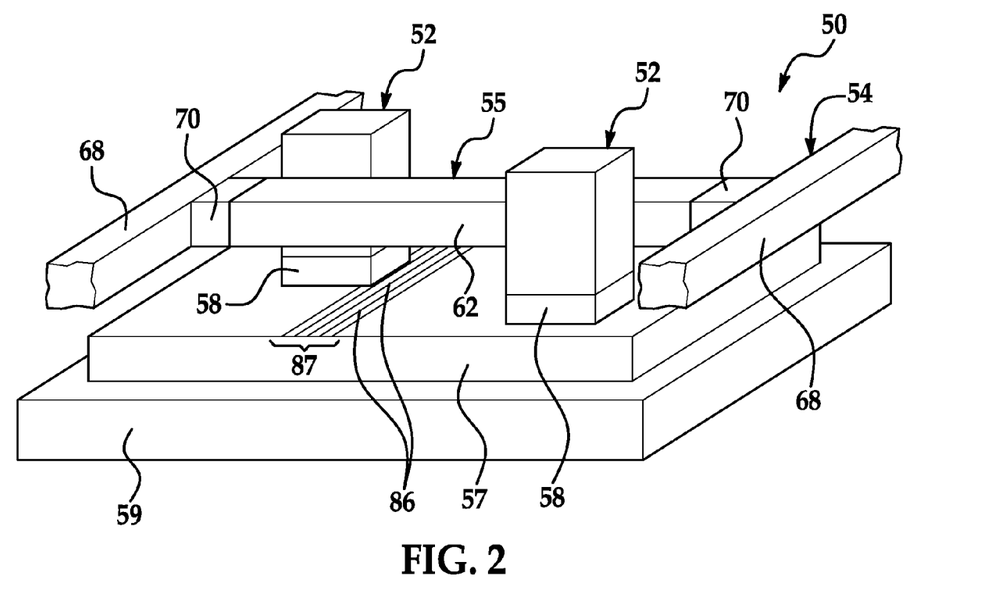
FIG. 2 is an illustration of a perspective view of a pair of tape application heads mounted on an automatically controlled gantry.

Referring particularly to FIGS. 1 and 2 of the drawings, a number of embodiments relate to an apparatus generally indicated by numeral 50 for producing composite components or structures, for example, a laminate structure 57, by applying bands 87 of composite tape 86 over a tool 59 or other substrate. In many embodiments, the composite fabrication apparatus 50 may be configured to produce composite structures, also sometimes referred to herein as a "part" 57, by adjusting tape position in response to a contour (not shown) of a part 57 being fabricated.

The apparatus 50 may include one or more tape application heads 58, each of which includes at least first and second groups of tape control modules 60a, 60b. Each of the application heads 58 is mounted on a manipulator 52 capable of moving the corresponding head 58 along one or more axes in order to guide the direction in which the bands of tape are applied. The manipulator 52 may be mounted on a machine tool system 54 for movement along multiple axes, which may comprise any of various known systems commonly used to displace tools along multiple axes. The manipulators 52, machine tool system 54 and application heads 58 may be controlled by one or more control systems 56 which may comprise, for example and without limitation, NC or CNC controllers.

Referring particularly now to FIG. 2, the apparatus 50 may comprise, for example and without limitation, a gantry system 55 comprising a gantry beam 62 having its opposite ends mounted on elevated rails 68 for linear movement thereon. The gantry beam 62 may include motors 70 provided with geared drives (not shown) for powering the gantry beam 62 along the rails 68. One or more manipulators 52 may be operatively and movably mounted on the gantry beam 62, with each manipulator 52 being provided a tape application head 58. In the example illustrated in FIG. 2, two manipulators 52 and heads 58 are mounted on opposite sides of a single gantry beam 62. The manipulator(s) 52 may be powered by motors (not shown) that drive the manipulator 52 along the gantry beam 62. Various electrical and other lines and cables (not shown) may be enclosed within conduits (not shown) in order to connect the motors, the manipulators 52, and the application heads 58 to the control system 56 of FIG. 1 and/or to other systems (not shown).

Figure 3:
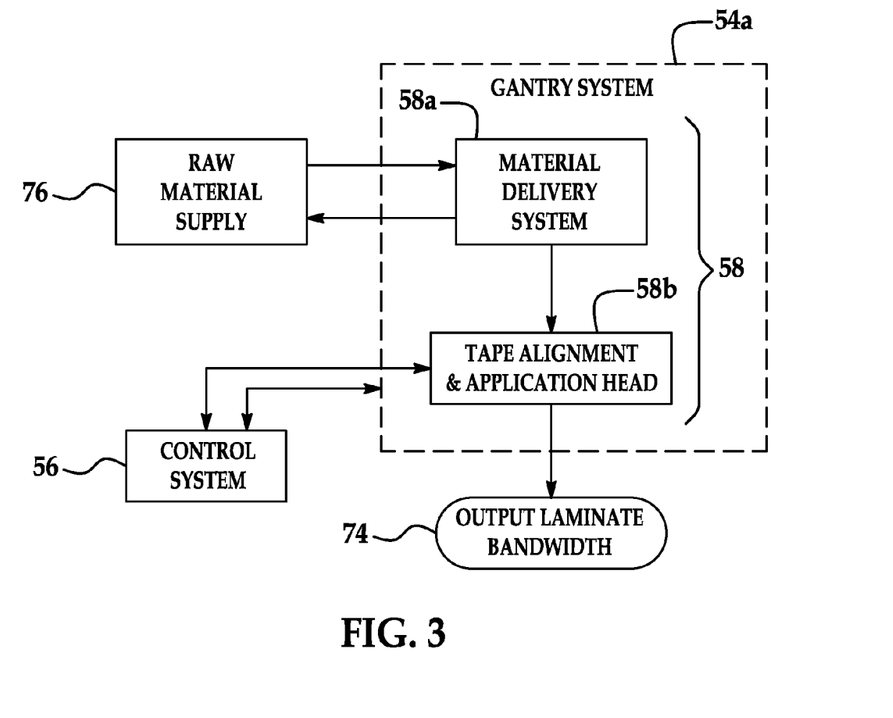
FIG. 3 is an illustration of a functional block diagram of a system for producing laminates using a gantry of the type shown in FIG. 2.

Attention is now directed to FIG. 3 which illustrates in block diagram form additional components of the apparatus 50. In many embodiments, the application head 58 may broadly include a material delivery system 58a and a tape alignment and application head 58b. The material delivery system 58a delivers tape or slit tape known as tows to the tape alignment and application head 58b, which applies the slit tape to a substrate, thereby forming a laminate bandwidth 74. As used herein, "composite fiber tape," "fiber tape," "tape," and "tape strips" are intended to include a wide range of tapes and tows of various widths. Composite tape is supplied to the material delivery system 58a from a suitable raw material supply 76. As previously mentioned, the operations of the gantry system 54a and the tape alignment and application head 58b are controlled by the control systems 56 (FIG. 1).

Figure 4:
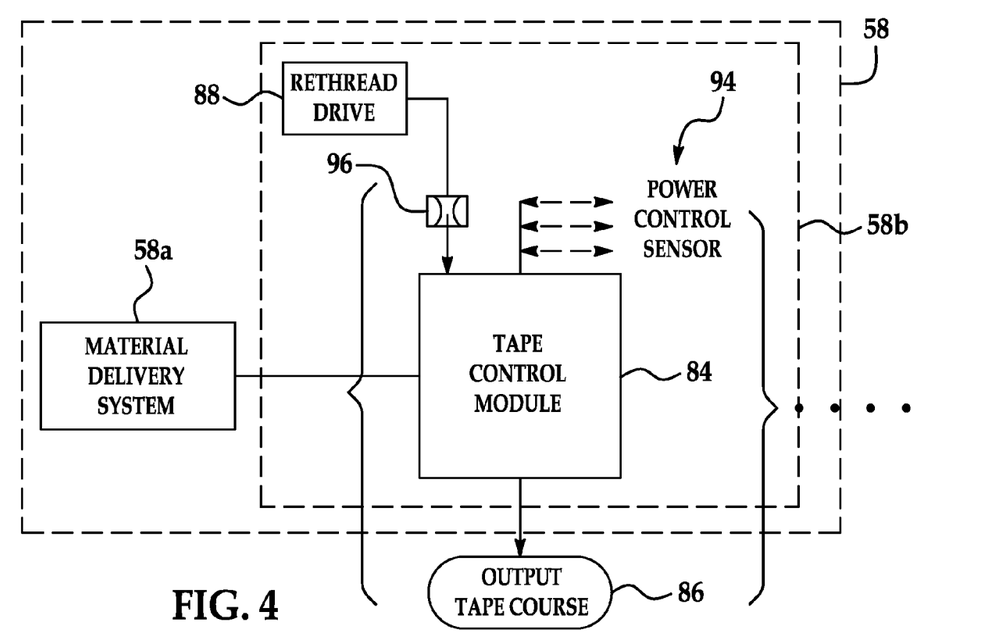
FIG. 4 is an illustration of a functional block diagram showing the relationship between a tape control module and other components of the application head.

Additional details are the tape alignment and application head 58b are shown in FIG. 4. Each of the tape alignment and application heads 58b may include a plurality of tape control modules 84 which output a tape course 86 (see FIG. 6) onto a substrate (not shown). As will be described later in more detail, each of the tape control modules 84 may be removably mounted on the tape alignment and application head 58b, allowing quick change out of the modules 84. Each of the modules 84 may be coupled to suitable power, control and sensor connections 94 by any suitable means. Each of the tape control modules 84 may also be connected by a coupling 96 to a rethread drive 88 or independent servo drive which functions to rethread the module 84 with tape supplied by the material delivery system 58a. Examples of tape control modules 84 may be found in U.S. Pat. No. 4,699,683 and U.S. Patent Publication No. 2007/0029030A1, the entire contents of both of which are incorporated by reference herein.

Figure 5:
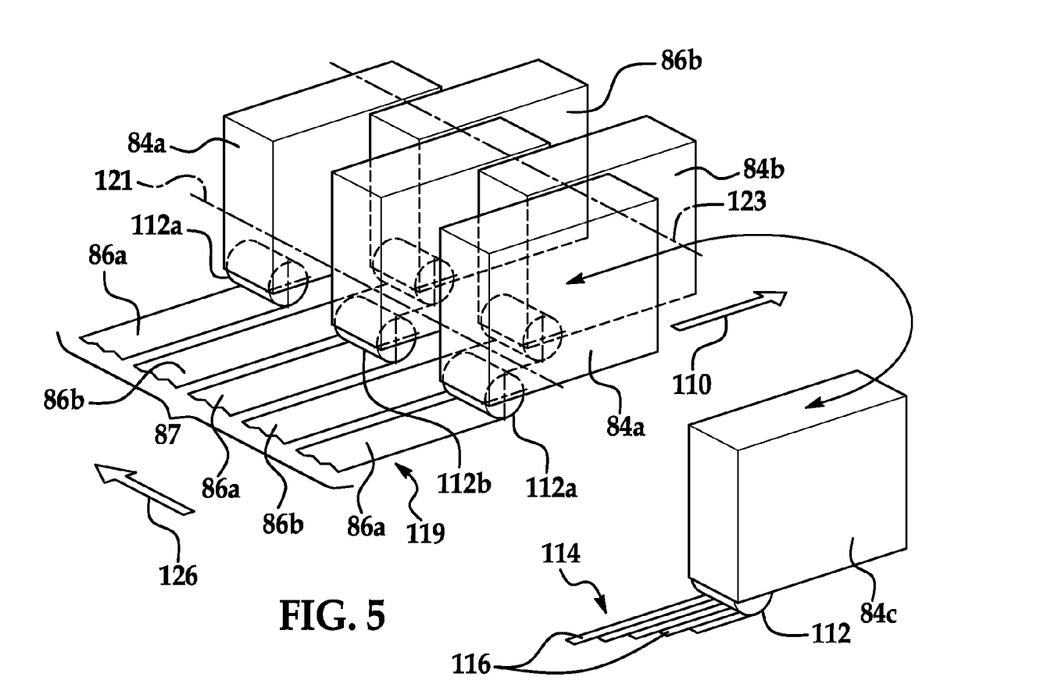
FIG. 5 is an illustration of a perspective view of a set of tape control modules, including an alternate form of a tape control module for laying down a band of narrow tape strips.
Figure 6:
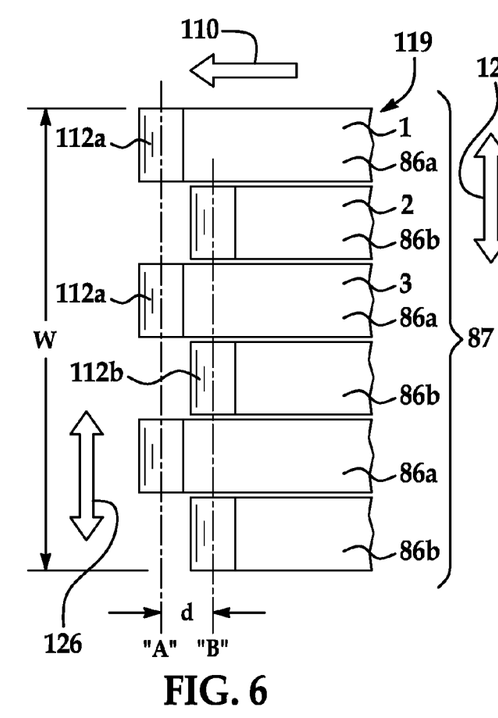
FIG. 6 is an illustration of a plan view of tape courses forming a single band, and showing the offset between the staggered groups of tape control modules.
Figure 7:
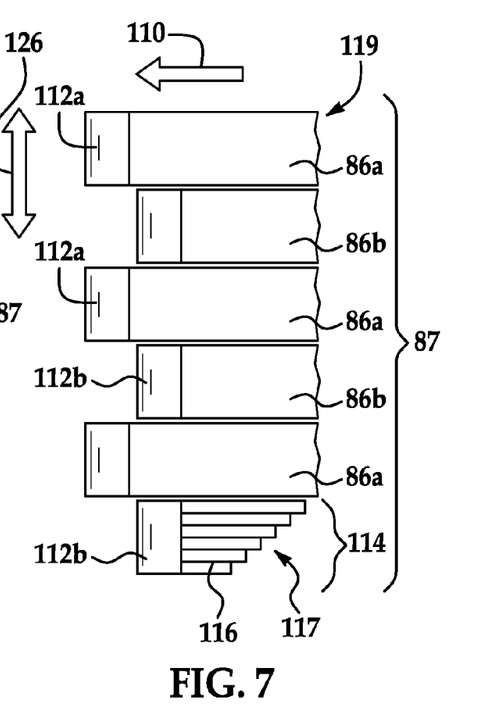
FIG. 7 is an illustration similar to FIG. 6 but showing the addition of a tape module laying down a band formed from narrow strips of tape.

Referring now to FIGS. 5, 6, and 7, as will be described later in more detail, in accordance with the disclosed embodiments, the tape control modules 84 are arranged in two alternating groups 84a, 84b that are staggered or offset in the direction of travel 110 of the application head 58 (see FIG. 2). As shown in FIG. 5, the modules 84 in group 84a are substantially aligned along a first axis 121 that extends in a direction 126 transverse to the direction of travel 110, while the modules 84 in group 84b are substantially aligned along a second axis 123 that extends substantially parallel to the first axis 121. As a result of this alignment and the offset relationship between the two groups of modules 84, as best seen in FIG. 6, the centerlines "A" and "B" of the compaction rollers 112a, 112b associated with the corresponding modules 84a, 84b are separated by a distance "d" in the direction of travel 110. The amount of offset or staggering (distance "d") between adjacent tape control modules 84 may be automatically adjusted by the previously discussed control system 56 (FIG. 1) using pre-programmed values.

The groups of modules 84a, 84b may apply courses of tape 86a, 86b in substantially edge-to-edge alignment to form a tape band 87 (FIG. 7) having a bandwidth "W". As a result of staggering the groups 84a, 84b of tape control modules 84, an advanced number 86a of the tape courses are laid up spatially advanced from a trailing number 86b of tape courses, and a bandwidth 87 of the tapes is laid up as an aggregate of the plurality of tape courses 86 at a trailing edge 119 of the trailing number of tape courses 86.

FIG. 7 illustrates an alternate embodiment wherein one or more tape control modules 84c (FIG. 5) may be mounted on the tape alignment and application head 58b, aligned with either module group 84a, 84b. The tape control module 84c applies a bandwidth 114 of tape segments 116 each having a width less than the tape courses 86a, 86b. The narrower, individual tape segments 116 allow a higher resolution profile 117 to be achieved on either end of the tape band 87.

Figure 8:
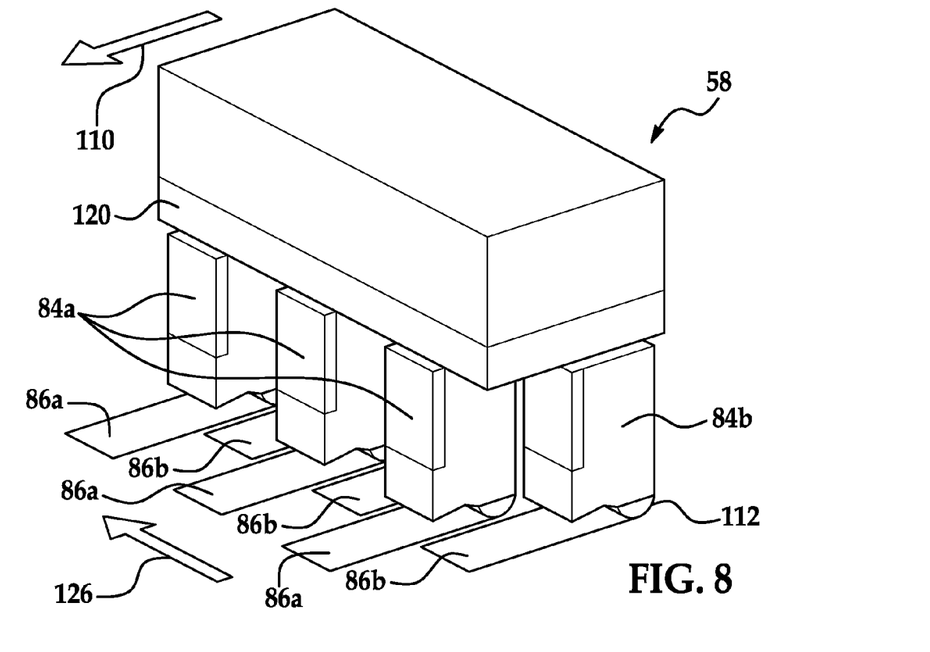
FIG. 8 is an illustration of a perspective view of a tape application head having staggered tape control modules.

Attention is now directed to FIG. 8 which illustrates an alternate form of the tape application head 58 wherein the distance between the centerlines 125 of two or more of the tape control modules 84, also referred to as "pitch", may be adjusted to control the aggregate bandwidth and thus aid in "steering" of the tape courses 86 or for other purposes. In the illustrated embodiment, the application head 58 includes two groups 84a, 84b of tape control modules 84 that are staggered in the direction of travel 110 of the head 58 and respectively apply tape courses 86a, 86b, similar to the groups 84a, 84b of tape control modules 84 shown in FIG. 5. The application head 58 may include a suitable tape module adjustment system 120 connected to one or more of the tape control modules 84 that may be controlled and operated by the control system 56 (FIG. 1). As will be discussed below, the tape module adjustment system 120 may comprise any of various known mechanical and/or electromechanical devices and/or assemblies that function to laterally displace one or more of the tape control modules 84 in a transverse direction 126, thereby adjusting the transverse position of one or more of the tape courses 86, wherein the transverse direction 126 is substantially orthogonal to the direction of travel 110 of the application head 58. Lateral displacement of one or more of the tape control modules 84 correspondingly alters the lateral position of the tape courses 86a, 86b. In one of several embodiments, the groups 84a, 84b of tape control modules 84 are automatically laterally adjustable relative to each other by the adjustment mechanism 120 based on a set of pre-programmed instructions forming part of the control system 56 (FIG. 1), while in other embodiments, the tape control modules 84 in either or both of the groups 84a, 84b may be separately laterally adjustable. The pitch between the tape modules 84 may be automatically adjusted prior to a bandwidth 87 being laid down, and/or may be dynamically adjusted "on-the-fly" as a bandwidth 87 is being laid down.

Figure 9:
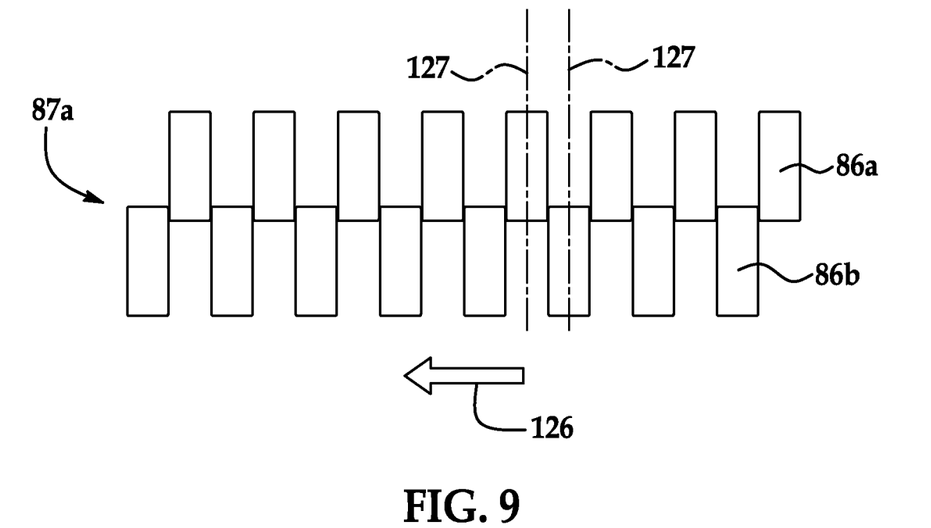
FIG. 9 is an illustration of a plan view showing tape courses laid down by an application head having sixteen tape control modules.

As discussed above, the automated adjustability of the lateral position of the tape control modules 84 allows relatively precise control over the lateral positions of the corresponding tape courses 86a, 86b in each band 87. For example as shown in FIG. 9, automated adjustment of the pitch between the tape modules 84 may be carried out in order to adjust the distance between the centerlines 127 of adjacent tape courses 86a, 86b such that the edges of the tape courses 86a 86b are essentially contiguous. Automated control of the lateral positions of adjacent tape courses 86a, 86b through dynamic adjustment of the pitch between the tape modules 84 may improve the ability to "steer" the band 87, particularly over surfaces having complex contours. Thus, the lateral or transverse positions of the tape control modules 84 may be adjusted to adapt to a contour of a part 57 being laid up, or for a variety of other purposes. The compression force applied by the tape control modules 84 through the compaction rollers 112 may be preset, while in other embodiments the pressure may adjusted based on one or more contours of the substrate where tape courses 86 are being laid down.

Figure 10:
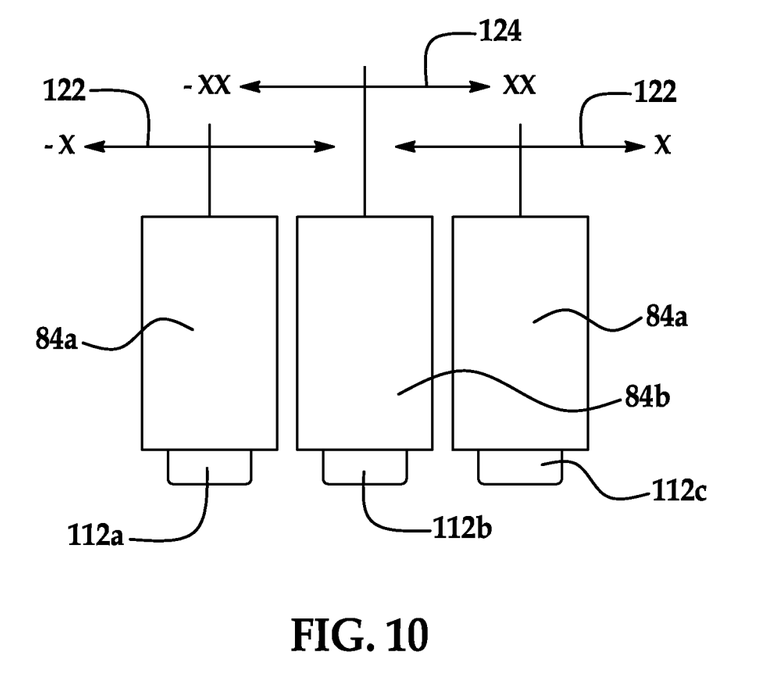
FIG. 10 is an illustration of a front view of three tape control modules which may form part of the tape application head illustrated in FIG. 8.

FIG. 10 illustrates the directions in which the tape control modules 84 may be automatically and independently adjusted. A tape control module 84b forming part of a first group 84b is axially offset or staggered relative to two tape control modules 84a forming part of a second group 84a. The modules 84a are laterally adjustable in either direction (X, −X) along a first common X axis 122 while the module 84b is laterally displaceable in either direction (XX, −XX) along an XX axis 124 that is offset from the X axis 122 in the direction of travel 110 of the tape application head 58 (FIG. 8). As mentioned above, the tape control modules 84 may be laterally adjusted, dynamically, on-the-fly as the tape courses 86 are being applied in order to aid in steering the applied tape band 87 (FIG. 5) and/or to cover complex substrate shapes and/or contours.

Figure 11:
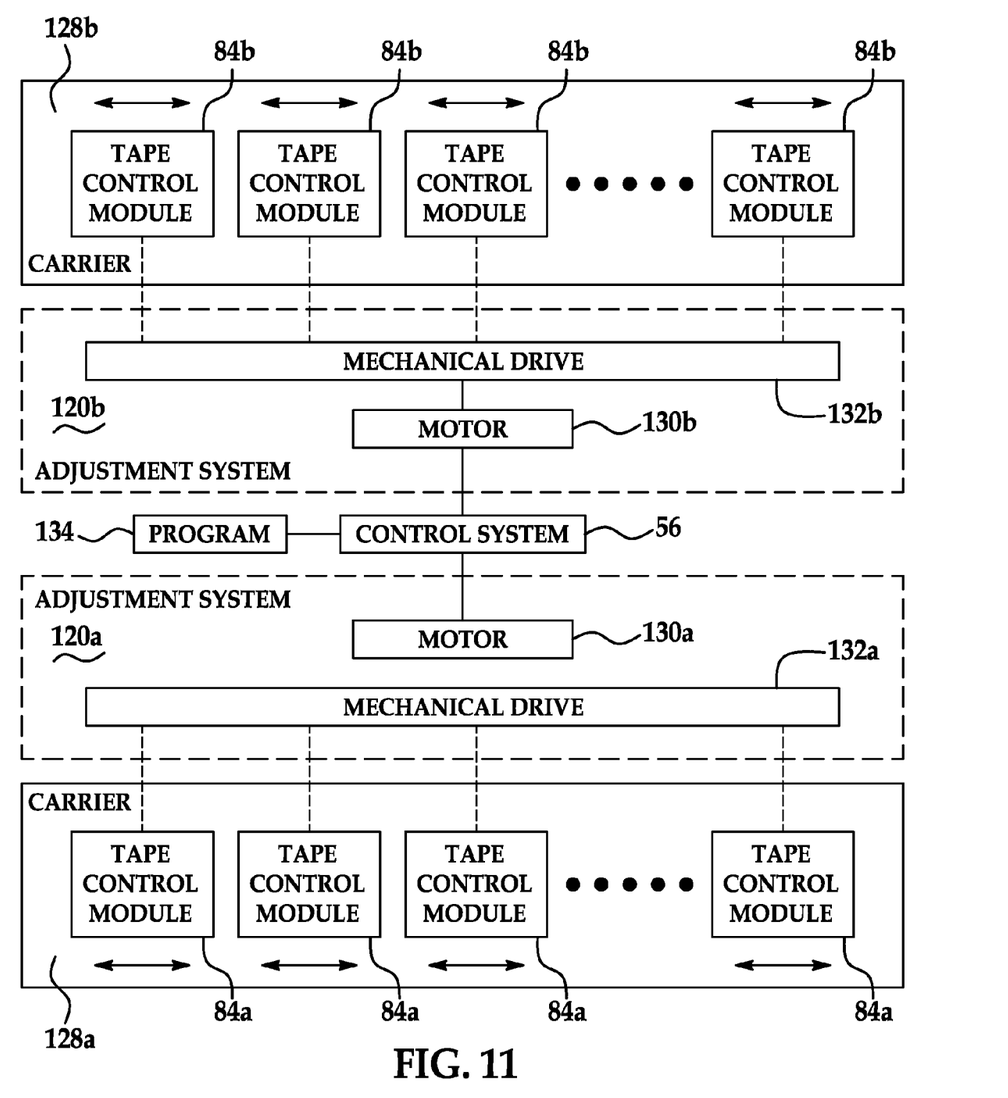
FIG. 11 is an illustration of a block diagram of a system for adjusting the lateral positions of the tape control modules.

Attention is now directed to FIG. 11 which illustrates further details of a system used to automatically adjust the lateral positions of the tape control modules 84. In the illustrated example, two staggered groups 84a, 84b of tape control modules 84 are shown, however, in other embodiments, automated lateral adjustment of the pitch between tape modules 84 may be advantageously employed where only a single group of tape control modules 84 is used.

Each group 84a, 84b of tape control modules 84 is mounted on the head 58 (FIGS. 1 and 2) for lateral adjustment on a corresponding carrier 128a, 128b. Each of the carriers 128a, 128b may comprise, without limitation, any of a variety of known types of mechanical supports, trays, tracks, rails or similar devices that mount and support the tape control modules for lateral movement on the head 58, substantially transverse to the direction of travel 110 (FIG. 5) of the head 58. Each of the tape module adjustment systems 120a, 120b is mounted on the head 58 and comprises a motor 130a, 130b coupled with a corresponding mechanical drive 132a, 132b. Each of the motors 132a, 132b may be, without limitation, pneumatic, hydraulic or electric, such as a stepper or servo motor (not shown). Each of the mechanical drives 132a, 132b may comprise, without limitation, a screw drive, a gear drive, a linkage assembly or any of various other known mechanical drive mechanisms. The motors 130a, 130b may be controlled and operated by the control system 56 or other programmed controller (not shown).

The control system 56, or other controller, controls and adjusts the lateral position of the tape control modules 84 based on a set of programmed instructions forming part of a control program 134. These programmed instructions may be based in part on the geometry and/or ply make-up of the composite structure 57 (FIG. 1) being fabricated. Each of the mechanical drives 132a, 132b is coupled with the tape control modules 84 in the corresponding group 84a, 84b. Each of the adjustment systems 120a, 120b may adjust the lateral position of one or more of the tape control modules 84 in the group 84a, 84b, either individually, or as a group. As mentioned above, the lateral positions of one or more of the tape control modules 84 may be adjusted dynamically as a bandwidth 87 of the tape courses 86 is being laid down.

Figure 12:
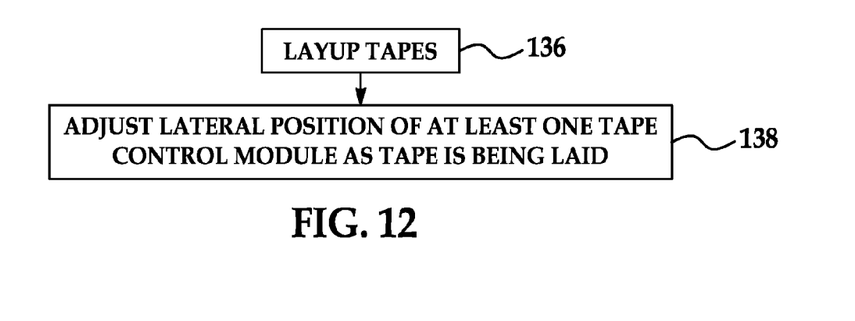
FIG. 12 is an illustration of a flow chart showing the steps of a method of laying up composite tape.

FIG. 12 shows the steps of a method of laying up composite tape using the technique previously described. At 136, courses of tape 86 are laid up using the tape control modules 84 mentioned above. At 138, the lateral position of at least one of the modules 84 is adjusted as the tape courses are being laid, thereby adjusting the lateral position of at least one of the tape courses 86.

Embodiments of the disclosure may find use in a variety of potential applications, particularly in the transportation industry, including for example, aerospace, marine and automotive applications. Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A method of laying composite tape to form a composite part, the method comprising:
    moving a gantry carrier in a direction of travel that is substantially linear;
    applying a first set of tape courses aligned in the direction of travel from a first set of tape control modules on a tool, the first set of tape control modules moveably connected to the gantry carrier;
    applying a second set of tape courses in the direction of travel from a second set of tape control modules on the tool, the second set of tape control modules moveably connected to the gantry carrier;
    controlling a position of each tape control module independent of a position of the other tape control modules while applying the plurality of tape courses;

adjusting a lateral position of the first set of tape control modules with respect to the second set of tape control modules while tape is being laid by the first set and the second set of tape control modules on the tool, in response to a change in a varied contour of the composite part, so as to maintain the first set of tape courses and the second set of tape courses substantially adjacent to each other in an edge to edge alignment, adjusting the lateral position including moving at least one of the first or second tape control modules on the gantry carrier in a transverse direction with respect to the substantially linear direction of travel of the gantry carrier; and adjusting a compression force applied by the first set of tape control modules and the second set of tape control modules in response to the change in the varied contour of the composite part.

2. The method of claim 1 wherein the adjusting step further comprises adjusting the lateral position of the first set of tape control modules and the second set of tape control modules such that a distance between a course of tape from a module in the first set of tape control modules is altered with respect to a course of tape from a module in the second set of tape control modules, the lateral position being substantially transverse to the direction of travel of the plurality of tape control modules.

3. The method of claim 2 wherein adjusting the lateral position is performed automatically according to a set of programmed instructions.

4. The method of claim 1 further comprising adjusting a stagger of the first set of tape control modules with respect to the second set of tape control modules while adjusting the lateral position, the stagger being substantially in a direction of travel of the first tape control module and the second tape control module.

5. A method of forming a composite part, the method comprising:
 moving a gantry carrier in a direction of travel that is substantially linear;
 laying up a first composite tape in the direction of travel, the first composite tape comprising a plurality of substantially evenly spaced tape segments, the first composite tape applied from a first tape control module moveably connected to the gantry carrier;
 laying up a second composite tape in the direction of travel, the second composite tape comprising a plurality of substantially evenly spaced tape segments, the second composite tape applied from a second tape control module moveably connected to the gantry carrier, and the first composite tape is laid up spatially advanced in the direction of travel with respect to the second composite tape;
 automatically adjusting a lateral position of the first composite tape with respect to the second composite tape while laying up the first composite tape and the second composite tape, the automatically adjusting a lateral position of the first composite tape being independent of the second composite tape, the adjusting in response to a change in a varied contour of the composite part and so as to maintain the first set of tape courses and the second set of tape courses substantially adjacent to each other in an edge to edge alignment, adjusting the lateral position including moving at least one of the first or second tape control module on the gantry carrier in a transverse direction with respect to the substantially linear direction of travel of the gantry carrier;
 adjusting a compression force applied to the first composite tape and the second composite tape in response to the change in the varied contour of the composite part; and
 aggregating the first composite tape and the second composite tape into a bandwidth of tape during lay-up.

6. The method of claim 5 wherein automatically adjusting the lateral position is performed using a programmed control system.

7. The method of claim 6 wherein the adjusting step comprises adjusting the lateral position of the first composite tape and the second composite tape in response to laying the first composite tape and the second composite tape over a complex contour.

8. The method of claim 5 wherein the plurality of tapes are aggregated into the bandwidth of the tapes.

9. The method of claim 5, further comprising a plurality of tapes are laid up advanced with respect to a plurality of trailing tapes respectively include advanced tapes in a direction that is substantially orthogonal to the direction of travel.

10. A method of applying bands of composite tape over a substrate to form a composite part with a complex contour, comprising:
 moving a gantry carrier in a direction of travel over a surface of the substrate that is substantially linear;
 moving a tape application head over a complex contour of a substrate in a direction of travel;
 laying down a first course of composite tape on the complex contour in the direction of travel, the first course of composite tape applied from a first tape control module moveably connected to the gantry carrier;
 laying down a second course of composite tape on the complex contour in the direction of travel, the second course of composite tape applied from a second tape control module moveably connected to the gantry carrier, and wherein the first composite tape is laid up spatially advanced in the direction of travel with respect to the second composite tape;
 adjusting a lateral position of the first course of composite tape with respect to the second course of composite tape as the head is moving over the substrate, the adjusting the lateral position of the first course of composite tape being independent of the second course of composite tape, in response to a change in a varied contour of the composite part, so as to maintain the first course and the second course substantially adjacent to each other in an edge to edge alignment, adjusting the lateral position including moving at least one of the first or second tape control module on the gantry carrier in a transverse direction with respect to the substantially linear direction of travel of the gantry carrier, and adjusting the lateral positions of the courses is performed by laterally displacing staggered groups of tape control modules on the tape application head; and
 adjusting a compression force applied to the first course of composite tape and the second course of composite tape in response to the change in the varied contour of the composite part.

11. The method of claim 10, wherein adjusting the lateral positions of the courses is performed automatically according to a set of programmed instructions.

12. The method of claim 11, wherein adjusting the lateral positions of the courses is performed by adjusting the lateral positions of tape control modules on the tape application head.

13. A tape layup machine for forming a composite part, comprising:

a gantry carrier configured to move in a direction of travel that is substantially linear over a surface of the composite part;

a first set of tape control modules and a second set of tape control modules for laying up tape in a direction of travel, the first set of tape control modules and the second set of tape control modules moveably connected to the gantry carrier;

means coupled with the modules for adjusting a lateral position of at least certain of the modules independently of the other modules, while the certain modules are laying up tape, and the means configured to adjust the lateral position by moving at least one of the first or second tape control modules on the gantry carrier in a transverse direction with respect to the substantially linear direction of travel of the gantry carrier;

a control system; and, a program used by the control system to adjust the lateral position of the at least certain modules as tape is being laid up by the modules over a varied surface contour, in response to a change in a varied contour of the composite part, so as to maintain a first course of tape and a second course of tape substantially adjacent to each other in an edge to edge alignment, and to adjust a compression force applied to the at least certain modules in response to the change in the varied contour of the composite part.

14. The machine of claim 13, wherein the tape control modules include first and second groups thereof staggered relative to each other in a direction of travel of the modules.

15. The machine of claim 14 wherein the tape control modules in the first and second staggered groups thereof are alternately arranged in a direction transverse to the direction of travel of the modules.

16. The machine of claim 13, wherein the adjusting means includes:
a motor, and
a drive coupling the motor with the at least certain modules, and
a programmed control system for controlling the operation of the motor.

17. A tape application machine for laying up composite tape on a substrate, comprising:
a head movable over the substrate in a direction of travel;
a gantry carrier mounted on the head configured to move in a direction of travel that is substantially linear over a surface of the substrate;
a plurality of tape control modules mounted on the carrier for laying up courses of tape on the substrate in the direction of travel, the plurality of tape control modules configured to move in a transverse direction with respect to the direction of travel by moving on the gantry carrier;
a motor mounted on the head; and
a drive coupled between the motor and the modules for adjusting a lateral position of at least one of the plurality of tape control modules on the head, such that a first tape control module is moved in the transverse direction with respect to a second tape control module while the first tape control module and the second tape control module lay down tape on the substrate, in response to a change in a varied contour of the substrate, the first tape control module moved independently of the second tape control module so as to maintain a first course of tape from the first tape control module and a second course of tape from the second tape control module substantially adjacent to each other in an edge to edge alignment, the drive further adjusting a compression force applied by the first set of tape control modules and the second set of tape control modules in response to the change in the varied contour of the substrate.

18. The machine of claim 17, wherein:
the plurality of tape control modules are arranged in first and second groups that are staggered relative to each other in the direction of travel of the head.

19. The machine of claim 18, wherein the tape control modules in the first and second groups thereof are alternately arranged in a direction substantially transverse to the direction of travel of the head.

20. The machine of claim 17, further comprising:
a control system for controlling the operation of the motor; and
a program used by the control system for adjusting the lateral position of the first tape control module and the second tape control module.

21. A method of applying bands of composite tape over a substrate, comprising:
moving a gantry carrier in a direction of travel over a surface of the substrate that is substantially linear;
moving a tape application head connected to the gantry carrier over the substrate in the direction of travel, the tape application head comprising a first set of tape application modules and a second set of tape application modules, each tape application module configured to apply a course of tape onto the substrate, each course of tape comprising a plurality of tape segments substantially equally spaced, the first set of tape application modules and the second set of tape application modules moveably connected to the gantry carrier;
simultaneously applying multiple courses of tape as a band to the substrate from the first set of tape application modules and the second set of tape application modules as the head moves over the substrate;
positioning the first set of tape application modules substantially aligned with a first axis and positioning the second set of tape application modules substantially aligned with a second axis, the first and the second axis substantially transverse to the direction of travel, and the first axis and the second axis separated by a distance; and
automatically adjusting the lateral position of the first set of tape application modules as the head moves over the substrate using pre-programmed instructions, the automatically adjusting being independent of the second set of tape application modules in response to a change in a varied contour of the substrate so as to maintain a first course of tape from the first tape control module and a second course of tape from the second tape control module substantially adjacent to each other in an edge to edge alignment, adjusting the lateral position including moving at least one of the first or second tape application modules on the gantry carrier in a transverse direction with respect to the substantially linear direction of travel of the gantry carrier; and
adjusting a compression force applied by the first set of tape application modules and the second set of tape application modules in response to the change in the varied contour of the substrate.

22. A machine for applying composite tape over a substrate, comprising:
a gantry carrier configured to move in a direction of travel that is substantially linear over a surface of the substrate;
a tape application head connected to the gantry carrier and adapted to travel over the substrate;
a first and a second group of tape application modules, each module operable for applying a course of composite tape to the substrate the composite tape comprising a plurality tape segments substantially evenly spaced, the first and the second groups of modules being staggered in the direction of travel of the gantry carrier such that the first group of tape application modules substantially aligns along a first axis and the second group of tape application modules substantially aligns along a second axis, the modules in the first group of tape application modules and the second group of tape application modules alternately arranged in side-by-side relationship such that the tape applied by the modules form a substantially continuous band, and wherein alternating courses of the tape are respectively applied by the tape control modules in the first and second groups thereof;

means for mounting the first and the second groups of tape application modules for movement relative to each other in a direction substantially traverse to the substantially linear direction of travel of the gantry carrier;

a first and a second adjustment system mounted on the head and respectively associated with the first and second groups of modules for adjusting the lateral positions of the modules, such that a transverse spacing between courses of tape may be adjusted, the transverse spacing of each module being independent of the other modules, each of the adjustment systems including a motor and a drive coupling the motor with the respectively associated group of modules for laterally displacing the modules, the first and the second adjustment systems configured to adjust the first and second groups of modules, in response to a change in a varied contour of the substrate, so as to maintain a first course of tape from the first group of modules and a second course of tape from the second group of modules substantially adjacent to each other in an edge to edge alignment;

a control system for controlling the operation of each of the adjustment systems; and a program used by the control system for controlling the operation of each of the adjustment systems while a tape application module is applying a course of composite tape and adjusting a compression force applied by the first group of tape control modules and the second group of tape control modules in response to the change in the varied contour of the substrate.

* * * * *